United States Patent
Bhandari et al.

(10) Patent No.: US 12,254,342 B2
(45) Date of Patent: *Mar. 18, 2025

(54) PLACING VIRTUAL GRAPHICS PROCESSING UNIT (GPU)-CONFIGURED VIRTUAL MACHINES ON PHYSICAL GPUs SUPPORTING MULTIPLE VIRTUAL GPU PROFILES

(71) Applicant: VMware LLC, Palo Alto, CA (US)

(72) Inventors: Akshay Bhandari, Bangalore (IN); Nidhin Urmese, Bangalore (IN)

(73) Assignee: VMWare LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,833

(22) Filed: Feb. 2, 2024

(65) Prior Publication Data

US 2024/0176643 A1 May 30, 2024

Related U.S. Application Data

(63) Continuation of application No. 17/176,223, filed on Feb. 16, 2021, now Pat. No. 11,934,854.

(30) Foreign Application Priority Data

Dec. 29, 2020 (IN) .............................. 202041056899

(51) Int. Cl.
  *G06F 9/455* (2018.01)
  *G06T 1/20* (2006.01)
  *G06T 1/60* (2006.01)

(52) U.S. Cl.
  CPC ............ *G06F 9/45558* (2013.01); *G06T 1/20* (2013.01); *G06T 1/60* (2013.01); *G06F 2009/4557* (2013.01); *G06F 2009/45583* (2013.01)

(58) Field of Classification Search
  None
  See application file for complete search history.

(56) References Cited

U.S. PATENT DOCUMENTS 10,176,550 B1 * 1/2019 Baggerman ............... G06T 1/60
2007/0083785 A1  4/2007 Sutardja
(Continued)

OTHER PUBLICATIONS

Chen, H. et al., GaaS Workload Characterization Under NUMA Architecture for Virtualized GPU, In 2017 IEEE International Symposium on Performance Analysis of Systems and Software (ISPASS), IEEE, 2017, pp. 65-76.

(Continued)

*Primary Examiner* — Adam Lee
(74) *Attorney, Agent, or Firm* — Quarles & Brady LLP

(57) ABSTRACT

In one set of embodiments, a computer system can receive a request to provision a virtual machine (VM) in a host cluster, where the VM is associated with a virtual graphics processing unit (GPU) profile indicating a desired or required framebuffer memory size of a virtual GPU of the VM. In response, the computer system can execute an algorithm that identifies, from among a plurality of physical GPUs installed in the host cluster, a physical GPU on which the VM may be placed, where the identified physical GPU has sufficient free framebuffer memory to accommodate the desired or required framebuffer memory size, and where the algorithm allows multiple VMs associated with different virtual GPU profiles to be placed on a single physical GPU in the plurality of physical GPUs. The computer system can then place the VM on the identified physical GPU.

20 Claims, 9 Drawing Sheets

(56) References Cited

U.S. PATENT DOCUMENTS

| | | |
|---|---|---|
| 2008/0140921 A1 | 6/2008 | Sutardja et al. |
| 2010/0033120 A1 | 2/2010 | Wang |
| 2013/0148947 A1 | 6/2013 | Glen et al. |
| 2013/0155083 A1 | 6/2013 | McKenzie et al. |
| 2014/0176583 A1 | 6/2014 | Abiezzi et al. |
| 2014/0181806 A1 | 6/2014 | Abiezzi et al. |
| 2014/0181807 A1 | 6/2014 | Fonesca et al. |
| 2015/0049094 A1 | 2/2015 | Yan et al. |
| 2015/0105148 A1 | 4/2015 | Consul et al. |
| 2015/0371355 A1 | 12/2015 | Chen |
| 2016/0189332 A1 | 6/2016 | Yoo et al. |
| 2016/0239441 A1 | 8/2016 | Chun et al. |
| 2018/0060996 A1 | 3/2018 | Tunuguntla et al. |
| 2018/0130171 A1 | 5/2018 | Prakash et al. |
| 2018/0204301 A1 | 7/2018 | Featonby et al. |
| 2019/0019267 A1 | 1/2019 | Suresh |
| 2019/0102212 A1* | 4/2019 | Bhandari ............ G06T 1/20 |
| 2019/0139185 A1* | 5/2019 | Baggerman ............ G06T 1/20 |
| 2019/0155660 A1 | 5/2019 | McQuighan et al. |
| 2019/0347137 A1* | 11/2019 | Sivaraman ............ G06F 9/45558 |
| 2020/0387393 A1* | 12/2020 | Xu ............ G06F 9/45558 |
| 2021/0011751 A1* | 1/2021 | Garg ............ G06F 9/5044 |
| 2021/0011773 A1* | 1/2021 | Garg ............ G06F 9/5044 |
| 2021/0026672 A1* | 1/2021 | Kurkure ............ G06F 9/5083 |
| 2021/0110506 A1* | 4/2021 | Prakash ............ G06F 9/505 |
| 2021/0263779 A1 | 8/2021 | Haghighat et al. |

OTHER PUBLICATIONS

Garg, A. et al., Empirical Analysis of Hardware-Assisted GPU Virtualization, In 2019 IEEE 26th International Conference on High Performance Computing, Data, and Analytics (HiPC), IEEE, 2019, pp. 395-405.

Garg, A. et al., Virtual Machine Placement Solution for vGPU Enabled Clouds, In 2019 International Conference on High Performance Computing & Simulation (HPCS), IEEE, 2019, pp. 897-903.

Herrera, A., NVIDIA Grid vGPU: Delivering Scalable Graphics-Rich Virtual Desktops, Whitepaper, Jun. 2015, 8 pages.

Kurkure, U. et al., Virtualized GPUs in High Performance Datacenters, In 2018 International Conference on High Performance Computing & Simulation (HPCS), IEEE, 2018, pp. 887-894.

Sivaraman, H. et al., Task Assignment in a Virtualized GPU Enabled Cloud, In 2018 International Conference on High Performance Computing & Simulation (HPCS), IEEE, 2018, pp. 895-900.

* cited by examiner

PLACING VIRTUAL GRAPHICS PROCESSING UNIT (GPU)-CONFIGURED VIRTUAL MACHINES ON PHYSICAL GPUs SUPPORTING MULTIPLE VIRTUAL GPU PROFILES

RELATED APPLICATIONS

This application is a continuation of U.S. application Ser. No. 17/176,223 filed Feb. 16, 2021, which claims the benefit is claimed under 35 U.S.C. 119(a)-(d) to Indian Application Serial No. 202041056899 filed Dec. 29, 2020, entitled "PLACING VIRTUAL GRAPHICS PROCESSING UNIT (GPU)-CONFIGURED VIRTUAL MACHINES ON PHYSICAL GPUS SUPPORTING MULTIPLE VIRTUAL GPU PROFILES", on Dec. 29, 2020, by VMware LLC, both of which are incorporated herein in their entirety by reference for all purposes.

BACKGROUND

Unless otherwise indicated, the subject matter described in this section is not prior art to the claims of the present application and is not admitted as being prior art by inclusion in this section.

Graphics processing unit (GPU) virtualization technologies such as Nvidia's GRID vGPU and AMD's Multiuser GPU allow a single physical GPU to be logically partitioned into multiple virtual GPUs, each of which is allocated a portion of the framebuffer memory of the physical GPU. These virtual GPUs are assigned and exposed to virtual machines (VMs), which enables the VMs to access the physical GPU via their respective virtual GPUs and thereby accelerate guest graphics workloads.

A VM that employs a virtual GPU (referred to herein as a virtual GPU-configured VM) is associated with a virtual GPU profile, which is a piece of metadata that indicates the desired or required framebuffer memory size of the VM's virtual GPU. This virtual GPU profile is consulted by a placement algorithm at the time of provisioning the VM within a host cluster in order to place the VM on a host system of the host cluster—and more specifically, on a physical GPU installed in a host system of the host cluster—that has sufficient available framebuffer memory to accommodate the VM's virtual GPU. For example, assume a host cluster C comprises two host systems H1 and H2, where H1 includes a physical GPU G1 with 4 gigabytes (GB) of framebuffer memory and H2 includes a physical GPU G2 with another 4 GB of framebuffer memory. Further assume that an administrator of host cluster C submits requests to provision two virtual GPU-configured VMs V1 and V2 on C, where V1 is associated with a virtual GPU profile P1 indicating a framebuffer memory size of 4 GB and V2 is associated with a virtual GPU profile P2 indicating a framebuffer memory size of 2 GB. In this scenario, VM V1 can be placed on physical GPU G1 of host system H1 because the framebuffer memory size of V1 (i.e., 4 GB, as indicated by virtual GPU profile P1) fits within the available framebuffer memory of G1, and VM V2 can be placed on physical GPU G2 of host system H2 because the framebuffer memory size of V2 (i.e., 2 GB, as indicated by virtual GPU profile P2) fits within the available framebuffer memory of G2.

One issue with existing algorithms for placing virtual GPU-configured VMs is that they generally assume each physical GPU in a host cluster supports a single virtual GPU profile at a time (or in other words, can only be partitioned into virtual GPUs having the same framebuffer memory size). As a result, these existing algorithms will not place VMs that are associated with different virtual GPU profiles on the same physical GPU. While this assumption is valid for current generations of GPU virtualization technologies like GRID vGPU, future generations of these technologies may support multiple virtual GPU profiles per physical GPU, which means that the use of existing placement algorithms on host clusters that implement such future generations may result in sub-optimal or incorrect placement decisions.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for placing virtual GPU-configured VMs on physical GPUs that support multiple virtual GPU profiles (i.e., multi-profile physical GPUs). As used herein, the phrase "placing a virtual GPU-configured VM on a physical GPU" refers to the act of allocating (or reserving) a portion of the framebuffer memory of the physical GPU to that VM, where the size of the allocated/reserved portion equals the framebuffer memory size indicated by the VM's virtual GPU profile.

In one set of embodiments, an algorithm is provided for placing virtual GPU-configured VMs on multi-profile physical GPUs that are homogenous in nature (i.e., are instances of the same GPU model or architecture). In another set of embodiments, an algorithm is provided for placing virtual GPU-configured VMs on multi-profile physical GPUs that are heterogeneous in nature (i.e., are instances of two or more different GPU models or architectures). In these latter embodiments, it is assumed that (a) each distinct GPU model/architecture is assigned a priority value indicating the desirability of that GPU model/architecture as a placement target, and (b) an administrator or other user may provide one or more placement preferences at the time of submitting VM provisioning requests, where each placement preference dictates that at least X VMs associated with a particular virtual GPU profile Y should be placed on a physical GPU of priority Z. If such placement preferences are provided, the algorithm can perform its placement of the requested VMs in accordance with those preferences, in either a "strict" or "non-strict" manner.

The foregoing and other aspects are described in further detail in the sections that follow.

2. Example Operating Environment

Figure 1:
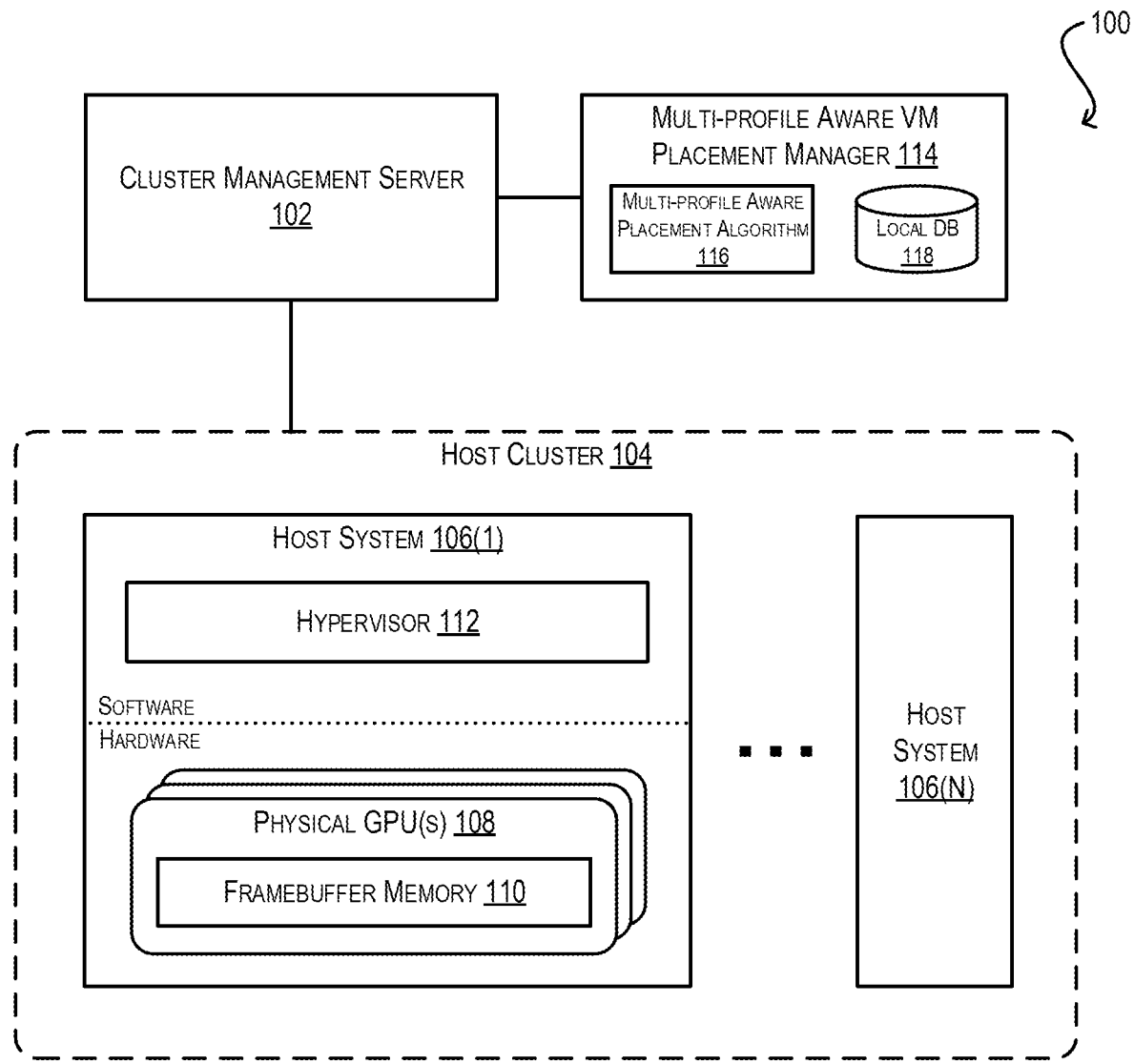
FIG. 1 depicts an example operating environment according to certain embodiments.

FIG. 1 depicts an example operating environment 100 that implements the techniques of the present disclosure. As shown, operating environment 100 includes a cluster management server 102 that is communicatively coupled with a host cluster 104 comprising a plurality of host systems 106(1)-(N). Cluster management server 102, which may run an instance of VMware's vCenter Server or any other similar cluster management software, is generally responsible for provisioning, configuring, and monitoring the entities in host cluster 104.

Each host system 106 of host cluster 104 includes, in hardware, one or more physical GPUs 108, and each physical GPU 108 has a corresponding framebuffer memory 110. A framebuffer memory (also known as graphics memory or video RAM (VRAM)) is a volatile random-access memory that a GPU uses to temporarily store and operate on data that it needs to drive a video display. This data can comprise, e.g., a bitmap (i.e., framebuffer) comprising color values for every pixel to be shown on the video display, as well as data for carrying out three-dimensional (3D) graphics rendering operations (e.g., texture data, geometry data, pixel shaders, etc.).

Each host system 106 of host cluster 104 also includes, in software, a hypervisor 112 that provides an environment in which one or more VMs can run. For purposes of this disclosure, it is assumed that host systems 106(1)-(N) implement a GPU virtualization technology such as Nvidia's GRID vCPU or AMD's Multiuser GPU and thus the VMs that are run on hypervisors 112(1)-(N) can include virtual GPU-configured VMs. As mentioned previously, a virtual GPU-configured VM is a VM that employs a virtual GPU (i.e., a logical GPU corresponding to a portion of the resources of a physical GPU, created via one of the GPU virtualization technologies noted above) to accelerate graphics workloads within the VM.

Generally speaking, each virtual GPU-configured VM that is created in host cluster 104 is associated with a virtual GPU profile which indicates the desired or required framebuffer memory size of the VM's virtual GPU. For example, a virtual GPU-configured VM that is designated to execute a complex or memory-intensive graphics workload (e.g., computer-aided design (CAD) or 3D game rendering) may be associated with a virtual GPU profile indicating a relatively large framebuffer memory size, while a virtual GPU-configured VM that is designated to execute a simple graphics workload (e.g., operating system (OS) desktop compositing and rendering) may be associated with a virtual GPU profile indicating a relatively small framebuffer memory size.

Figure 2A:
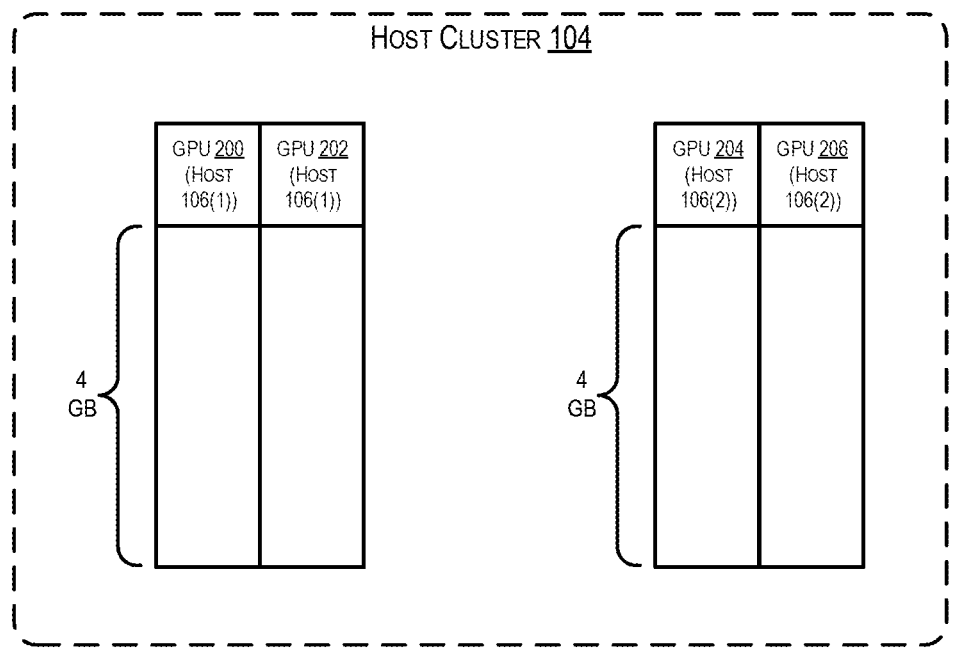
FIGS. 2A, 2B, and 2C depict example VM placements determined by an existing placement algorithm.
Figure 2B:
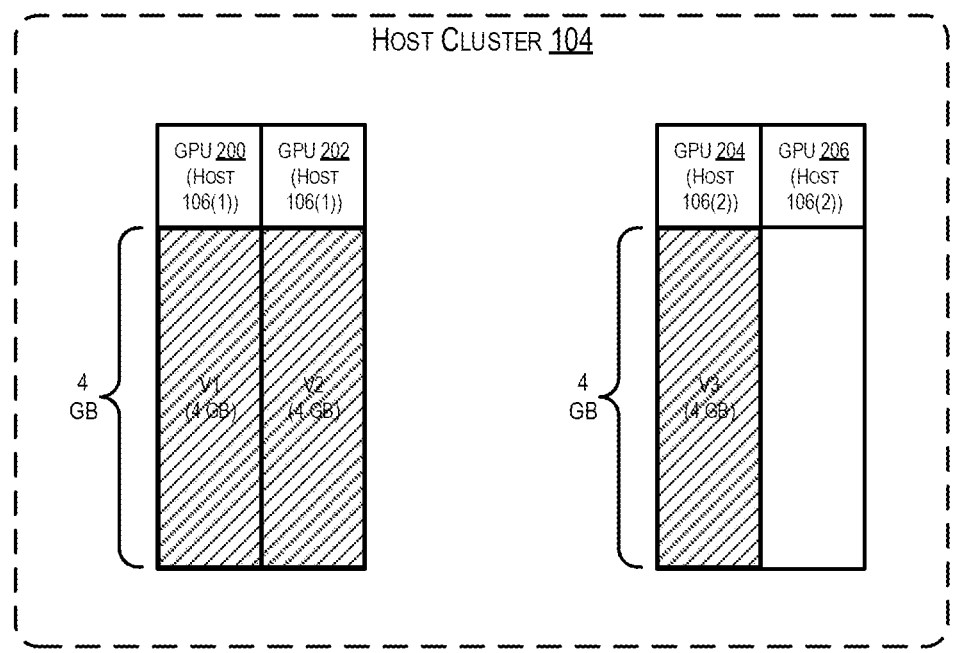
Figure 2C:
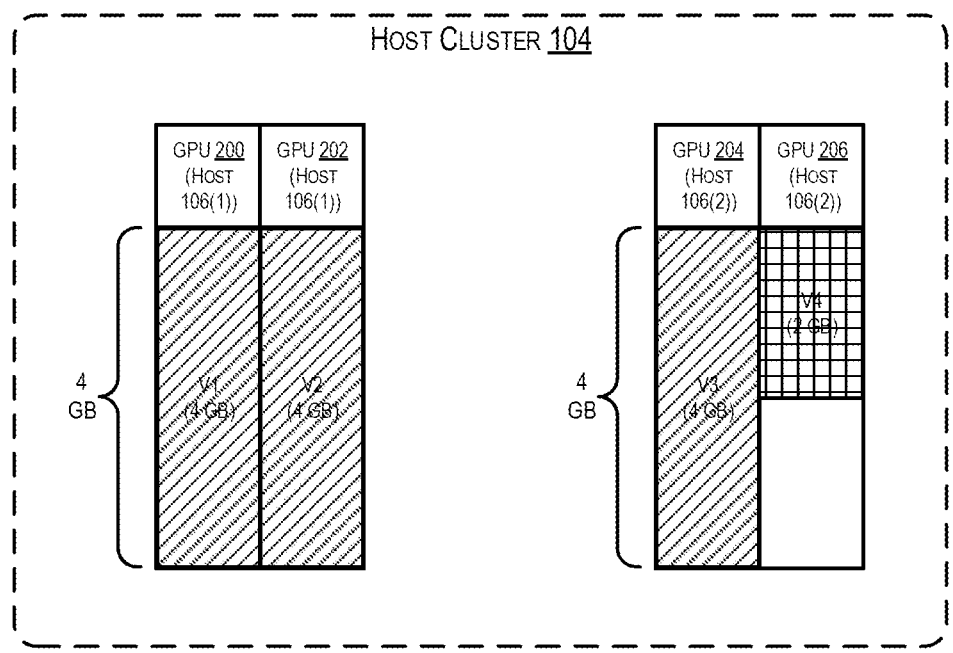

In addition, at the time of provisioning such virtual GPU-configured VMs within host cluster 104, a placement algorithm is executed for "placing" the VMs on the cluster's physical GPUs, which involves (a) identifying, for each VM, a physical GPU that has sufficient free framebuffer memory to accommodate (i.e., fit) the VM's desired/required framebuffer memory size, as defined by the VM's virtual GPU profile, and (b) allocating (or reserving) that amount of the physical GPU's framebuffer memory to the VM. For instance, consider the example scenario shown in FIG. 2A where host cluster 104 comprises two host systems 106(1) and 106(2) and these host systems include a total of four physical GPUs 200-206 (two on 106(1) and another two on 106(2)), each with 4 GB of framebuffer memory. In this scenario, if a cluster administrator submits requests to provision three virtual GPU-configured VMs V1, V2, and V3—each with a virtual GPU profile of 4 GB—in host cluster 104, V1 can be successfully placed on physical GPU 200 of host system 106(1), V2 can be successfully placed on physical GPU 202 of host system 106(1), and V3 can be successfully placed on physical GPU 204 of host system 106(2) as depicted in FIG. 2B. Further, if the cluster administrator subsequently submits a request to provision a fourth virtual GPU-configured VM V4 with a virtual GPU profile of 2 GB, V4 can be successfully placed on physical GPU 206 of host system 106(2) as depicted in FIG. 2C.

As noted in the Background section, one limitation with existing VM placement algorithms is that they assume each physical GPU in a host cluster can only support one type of virtual GPU profile at a time. This limitation, which arises out of the constraints of current generation GPU virtualization technologies, means that such existing algorithms will not place VMs associated with different virtual GPU profiles (or in other words, different virtual GPU framebuffer memory sizes) on the same physical GPU. Instead, they will only place VMs with the exact same virtual GPU profile/framebuffer memory size on any given physical GPU.

The foregoing is problematic because it is likely that future generations of GPU virtualization technologies will support multiple virtual GPU profiles per physical GPU, and thus the use of existing placement algorithms in host clusters that implement these future generations will result in suboptimal or incorrect decisions. For example, assume host cluster 104 depicted in FIGS. 2A-2C supports multi-profile physical GPUs and, after the placement of VM V4 on physical GPU 206 as shown in FIG. 2C, the cluster administrator submits a request to provision a fifth virtual GPU-configured VM V5 with a virtual GPU profile of 1 GB. In this case, if the host cluster employs an existing placement algorithm that assumes each physical GPU 200/202/204/206 only supports a single virtual GPU profile, the algorithm will not place VM V5 on physical GPU 206—even though physical GPU 206 has enough free framebuffer memory to accommodate V5—because a VM with a different profile (i.e., V4) is already placed on physical GPU 206. As a result, the provisioning request for VM V5 will fail, which is an incorrect and undesirable outcome.

To address this and other similar problems, operating environment 100 of FIG. 1 includes a multi-profile aware VM placement manager (hereinafter referred to as simply "placement manager") 114 that is communicatively coupled with cluster management server 102. As shown, placement manager 114 implements a multi-profile aware placement algorithm 116 and a local database 118. Local database 118 is configured to maintain an up-to-date inventory of the physical GPUs in host cluster 104 that can include, for each physical GPU 108: (a) the host system where the physical GPU is installed/resides, (b) the GPU model/architecture type of the physical GPU, (c) a priority value (if applicable) for the physical GPU, (d) the total amount of framebuffer memory of the physical GPU, and (e) the current amount of available/free (i.e., unallocated) framebuffer memory of the physical GPU.

In one set of embodiments (detailed in section (3) below), placement manager 114 can use its multi-profile aware placement algorithm 116 and local database 118 to optimally place virtual GPU-configured VMs within host cluster 104 in the case where the host cluster's physical GPUs support multiple virtual GPU profiles (i.e., are "multi-profile physical GPUs") and are homogenous in nature (i.e., are all instances of the same GPU model or architecture). By way of example, the physical GPUs may all be Nvidia A100 GPUs. In these embodiments, placement manager 114 can treat each physical GPU 108 as an equivalent "bin" and attempt to pack as many VMs into each physical GPU bin as possible, with the goal of fulfilling all VM provisioning requests submitted by the cluster administrator.

In another set of embodiments (detailed in section (4) below), placement manager 114 can use its multi-profile aware placement algorithm 116 and local database 118 to optimally place virtual GPU-configured VMs within host cluster 104 in the case where the host system's physical GPUs support multiple virtual GPU profiles and are heterogeneous in nature (i.e., are instances of two or more different GPU models or architectures). By way of example, a first set of physical GPUs may be Nvidia A100 GPUs and a second set of physical GPUs may be Nvidia V100 GPUs. In these embodiments, each physical GPU model/architecture type can be associated with a predefined priority value indicating the desirability of that model/architecture type as a placement target. For instance, a relatively newer GPU model/architecture type may be associated with a higher priority value (because it is likely to be more performant and/or have more features) while a relatively older GPU model/architecture type may be associated with a lower priority value (because it is likely to be less performant and/or have less features).

In addition, at the time of submitting VM provisioning requests, the cluster administrator (or other user) can optionally provide one or more placement preferences that define conditions/constraints regarding how the requested VMs may be placed. For example, in a particular embodiment each placement preference can indicate that at least X VMs associated with a given virtual GPU profile Y should be placed on a physical GPU of priority Z. Upon receiving such placement preferences, placement manager 114 can place the requested VMs in a manner that strictly adheres to the provided preferences (at the expense of possibly preventing some VMs from being successfully placed), or in a manner that loosely adheres to the provided preferences (with the goal of successfully placing as many of the requested VMs as possible, while still satisfying at least some of the preferences).

In the case of strict adherence to the placement preferences, placement manager 114 can be understood as effectively maximizing the value of the following cost function, where n is the total number of different virtual GPU profiles for which VM provisioning is requested, k is the total number of distinct physical GPU priorities, $numvm_i$ is the total number of requested VMs associated with virtual GPU profile i, $profileSize_i$ is the framebuffer memory size indicated by virtual GPU profile i, $priority_j$ is the priority value for physical GPU priority j, and $prefnumvm_{ij}$ is the number of requested VMs having virtual GPU profile i that should be placed on a physical GPU of priority j:

Listing 1
$$\text{cost} = \sum_{j=1}^{k}\sum_{i=1}^{n}(priority_j * profileSize_i * prefnumvm_{ij}) +$$
$$\sum_{j=1}^{k}\sum_{i=1}^{n}(priority_j * profileSize_i * (numvm_i - prefnumvm_{ij}))$$

In the case of loose (i.e., non-strict) adherence to the placement preferences, placement manager 114 can also be understood as maximizing the cost function above, but with the modification of estimating a value $allocatedprefnumvm_{ij}$ in place of $prefnumvm_{ij}$ for each virtual GPU profile i and priority j such that $allocatedprefnumvm_{ij} \leq prefnumvm_{ij}$ and all VM provisioning requests are fulfilled/completed.

It should be appreciated that operating environment 100 of FIG. 1 is illustrative and not intended to limit embodiments of the present disclosure. For instance, although FIG. 1 depicts a particular arrangement of entities and components within operating environment 100, other arrangements are possible (e.g., the functionality attributed to a particular entity/component may be split into multiple entities/components, entities/components may be combined, etc.). As one example, in some embodiments placement manager 114 may be implemented as an integral part of cluster management server 102. Further, the various entities/components shown may include sub-components and/or functions that are not specifically described. One of ordinary skill in the art will recognize other variations, modifications, and alternatives.

3. Placement Workflow for Homogenous Multi-Profile Physical GPUs

Figure 3:
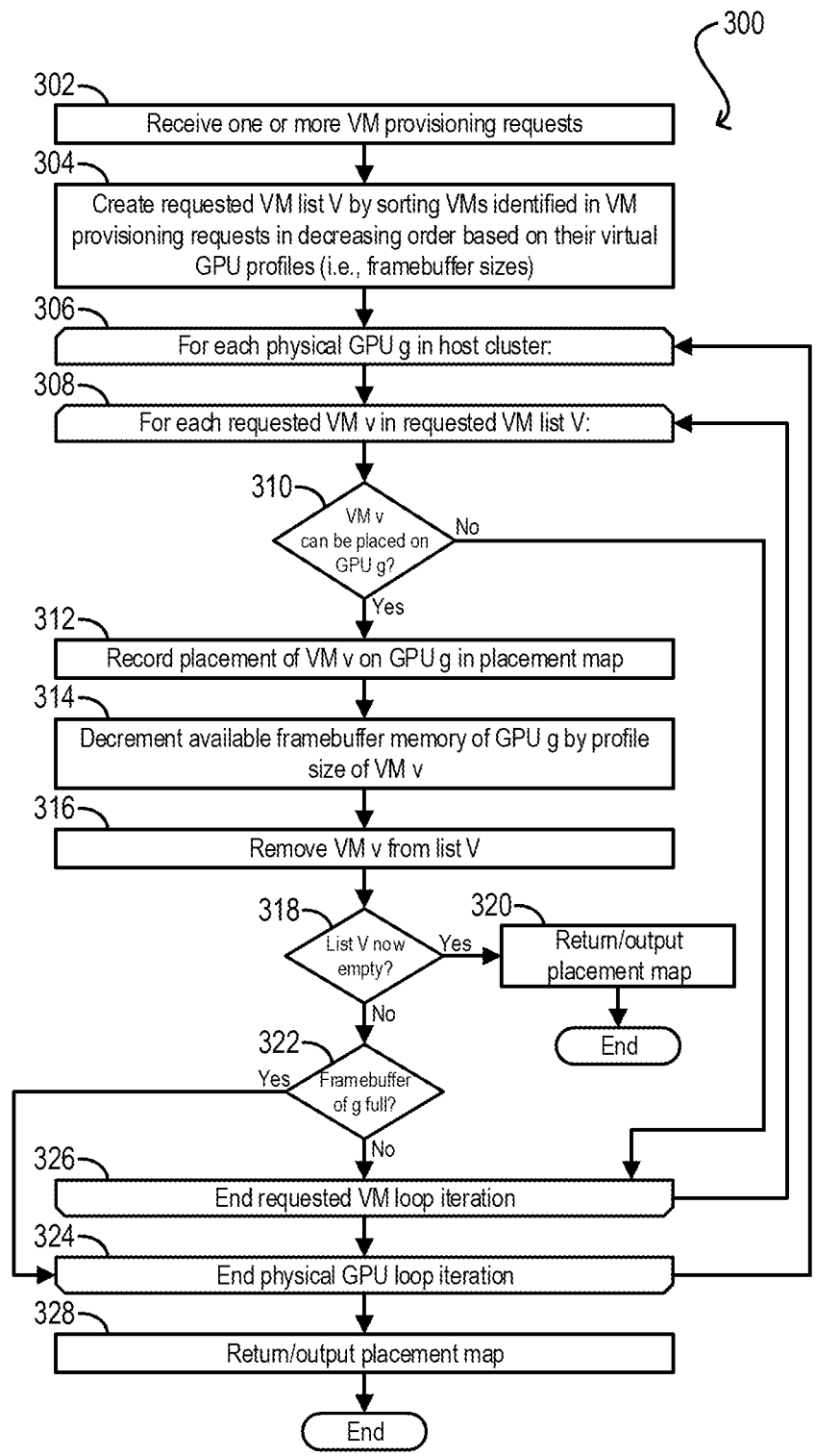
FIG. 3 depicts a workflow for placing virtual GPU-configured VMs on multi-profile physical GPUs that are homogeneous in nature according to certain embodiments.

FIG. 3 depicts a workflow 300 that may be executed by placement manager 114 of FIG. 1, in accordance with its multi-profile aware placement algorithm 116, for placing virtual GPU-configured VMs on the physical GPUs of host cluster 104 in the case where the physical GPUs support multiple virtual GPU profiles and are homogenous in nature.

Starting with block 302, placement manager 114 can receive one or more VM provisioning requests submitted by a cluster administrator or other user via cluster management server 102, where each VM provisioning request identifies a virtual GPU-configured VM to be provisioned (i.e., allocated/placed on host resources) within host cluster 104 and a virtual GPU profile associated with the requested VM. For instance, the following table presents an example set of thirteen VM provisioning requests:

TABLE 1

| VM | Virtual GPU Profile (framebuffer size) |
|---|---|
| V1 | 4 GB |
| V2 | 4 GB |
| V3 | 4 GB |
| V4 | 3 GB |
| V5 | 3 GB |
| V6 | 3 GB |
| V7 | 2 GB |
| V8 | 2 GB |
| V9 | 2 GB |
| V10 | 2 GB |
| V11 | 1 GB |
| V12 | 1 GB |
| V13 | 1 GB |

At block 304, placement manager 114 can create a list of requested VMs V by sorting the VMs identified in the provisioning requests in decreasing order based on their virtual GPU profiles (i.e., framebuffer memory sizes). Placement manager 114 can then enter a first loop for each physical GPU g in host cluster 104 as determined from local database 118 (block 306) and a second loop for each VM v in requested VM list V, in sorted order (block 308).

Within the second loop, placement manager 114 can check whether VM v can be placed on physical GPU g (or in other words, whether physical GPU g has sufficient free framebuffer memory to accommodate the framebuffer memory size of VM v) (block 310). If the answer is yes, placement manager 114 can record the placement of VM v on physical GPU g in a placement map data structure (block 312), decrement the amount of free framebuffer memory available to physical GPU g by the framebuffer memory size of VM v (block 314), and remove VM v from requested VM list V (block 316). In addition, placement manager 114 can check whether requested VM list V is now empty, which indicates that all requested VMs have been placed (block 318). If so, placement manager 114 can return/output the placement map (block 320) and terminate the workflow. Although not shown in FIG. 3, once the placement map is output, placement manager 114 (or alternatively cluster management server 102) can proceed with placing the VMs on their respective physical GPUs—or in other words, allocating framebuffer memory on those GPUs to the VMs—in accordance with the placement map.

On the other hand, if requested VM list V is not empty, placement manager 114 can check whether the framebuffer memory for physical GPU g is now full (i.e., has been fully allocated) (block 322). If the answer is yes, placement manager 114 can skip to the end of the current GPU loop iteration (block 324). Otherwise, placement manager 114 can reach the end of the current VM loop iteration (block 326) and proceed to process the next VM v in requested VM list V with respect to current physical GPU g.

Finally, if placement manager 114 iterates through all of the physical GPUs in host cluster 104 without placing all VMs in requested VM list V, placement manager 114 can return/output the current placement map (block 328) and exit the workflow. As mentioned above, once the placement map is output, placement manager 114 (or alternatively cluster management server 102) can proceed with placing the VMs on their respective physical GPUs in accordance with the placement map.

Figure 4A:
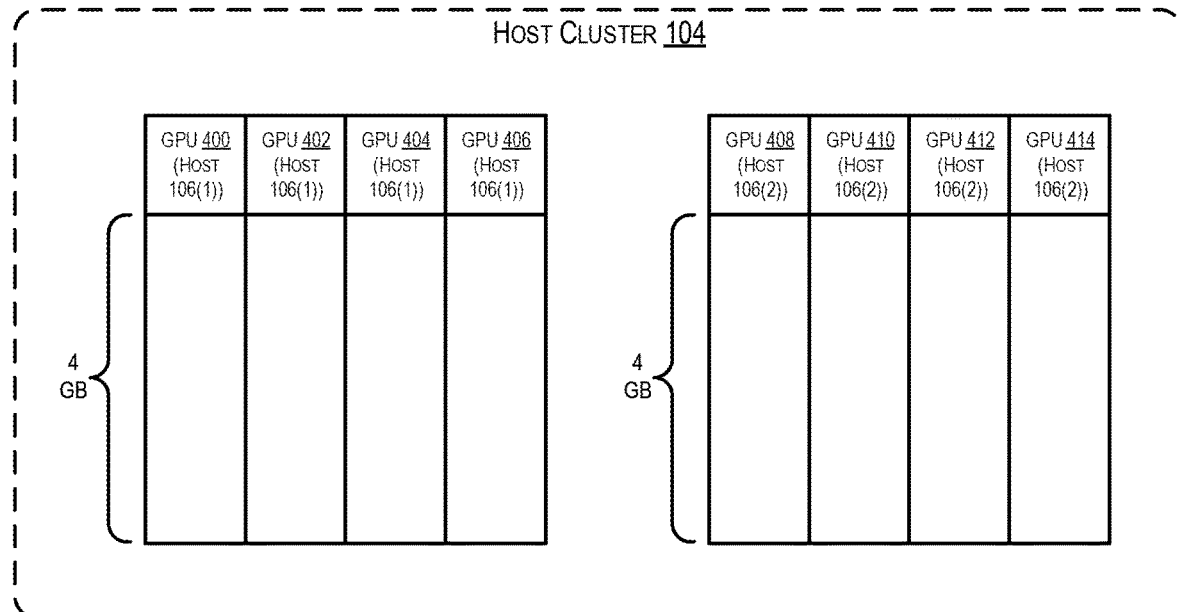
FIGS. 4A and 4B depict example VM placements determined by the workflow of FIG. 3 according to certain embodiments.
Figure 4B:
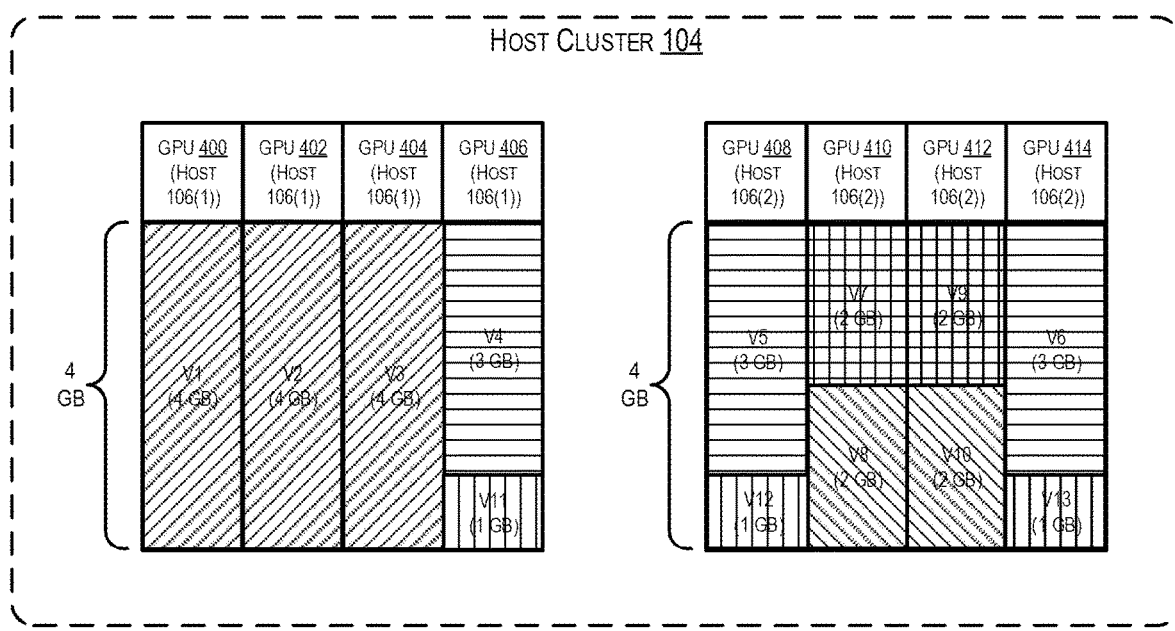

To provide a concrete example of the operation of workflow 300, FIG. 4A depicts a scenario in which (a) host cluster 104 comprises two host systems 106(1) and 106(2), and (b) host systems 106(1) and 106(2) include a total of eight homogeneous physical GPUs (400-406 on 106(1) and 408-412 on 106(2)), each with 4 GB of total framebuffer memory. Further, FIG. 4B depicts the results of applying workflow 300 on host cluster 104 of FIG. 4A with respect to the set of VM provisioning requests presented in Table 1. As shown in FIG. 4B, VMs V1-V4 and V11 are successfully placed on physical GPUs 400-406 of host system 106(1) and VMs V5-V10, V12, and V13 are successfully placed on physical GPUs 408-412 of host system 106(2) in accordance with their respective virtual GPU profiles.

4. Placement Workflow for Heterogeneous Multi-Profile Physical GPUs

Figure 5A:
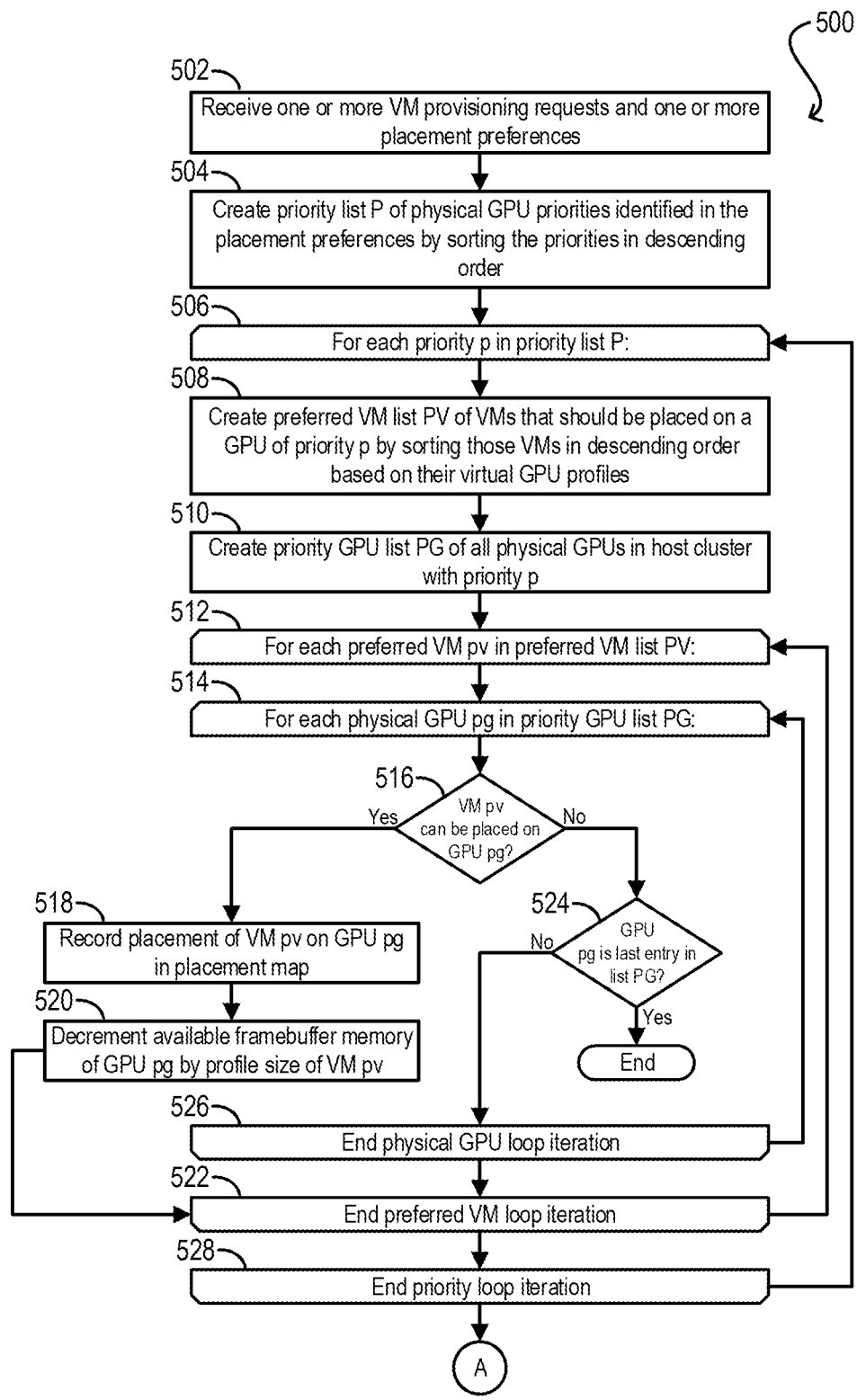
FIGS. 5A, 5B, and 5C depict a workflow for placing virtual GPU-configured VMs on multi-profile physical GPUs that are heterogeneous in nature according to certain embodiments.
Figure 5B:
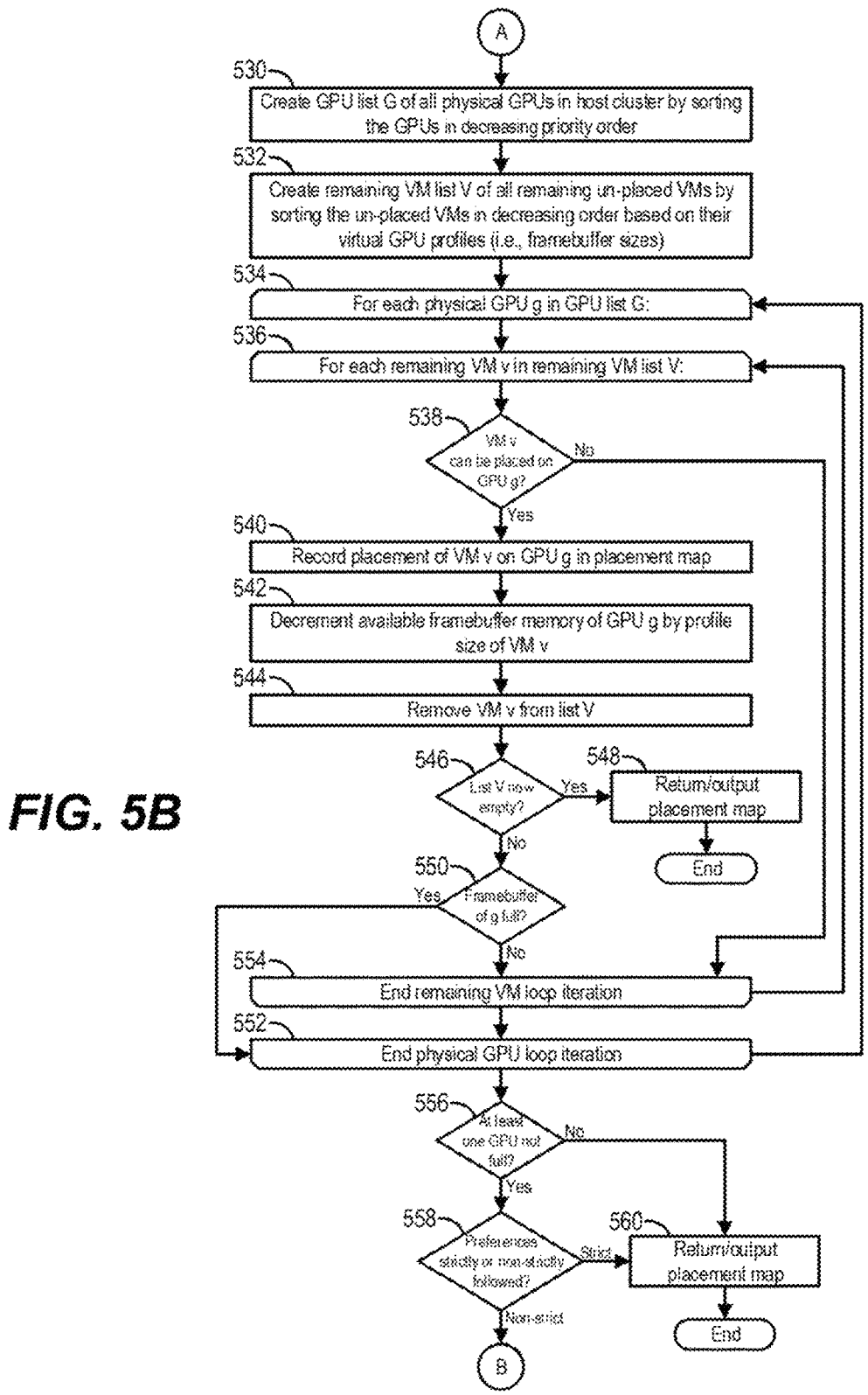
Figure 5C:
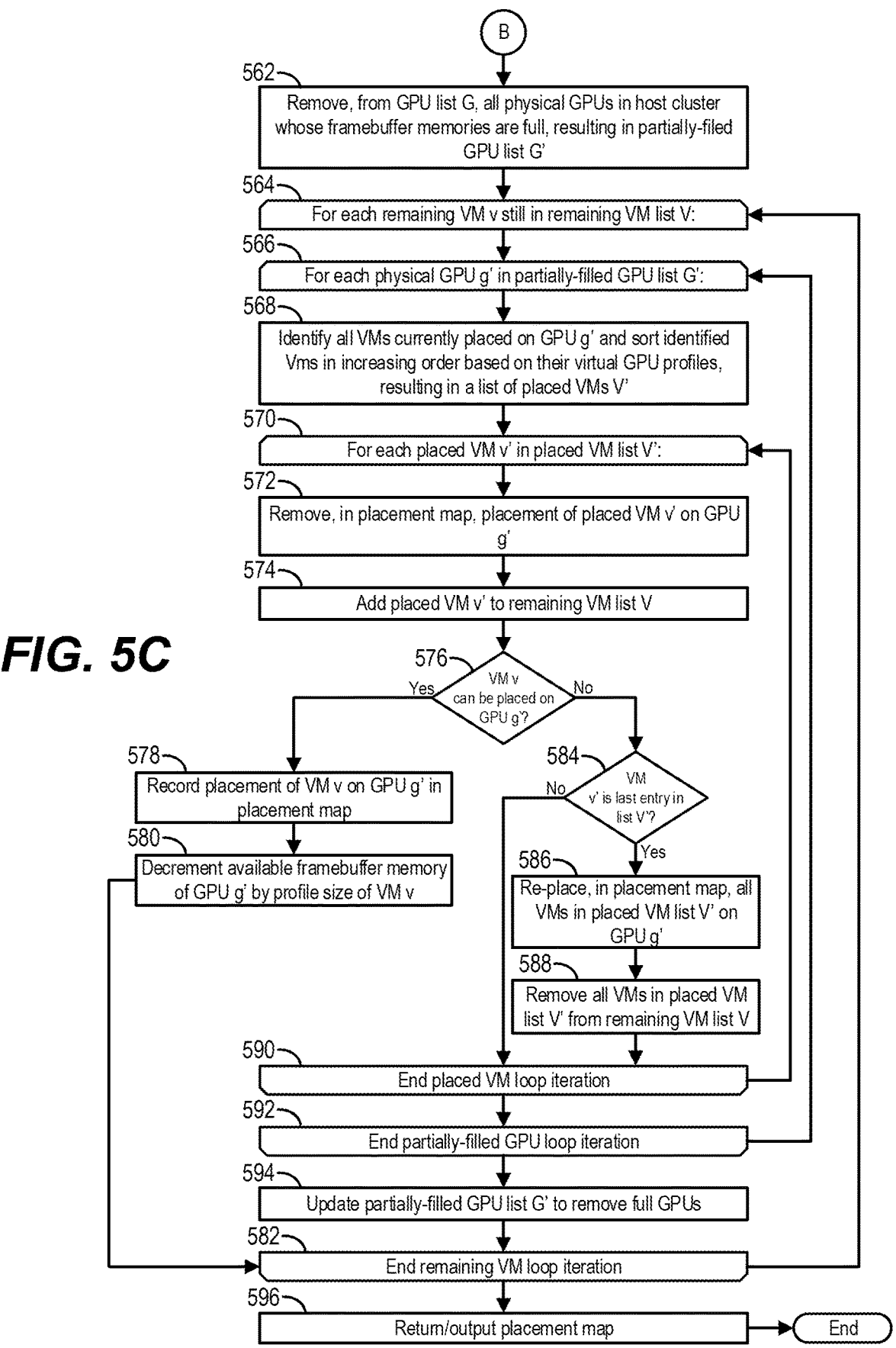

FIGS. 5A, 5B, and 5C depict a workflow 500 that may be executed by placement manager 114 of FIG. 1 for placing virtual GPU-configured VMs on the physical GPUs of host cluster 104 in the case where the physical GPUs support multiple virtual GPU profiles and are heterogeneous in nature. Workflow 500 makes two assumptions: first, each physical GPU 108 is assigned a predetermined priority value based on the GPU's model/architecture type; and second, in addition VM provisioning requests, a cluster administrator or other user submits one or more placement preferences that prefer (or require) that certain numbers of VMs associated with certain virtual GPU profiles be placed on physical GPUs of certain priorities. In the scenario where no such placement preferences are provided, placement manager 114 can simply treat the heterogeneous physical GPUs as being homogeneous and reuse the homogeneous GPU workflow shown in FIG. 3.

At a high level, workflow 500 proceeds according to three phases that correspond to FIGS. 5A, 5B, and 5C respectively. In the first phase (FIG. 5A), placement manager 114 attempts to place all of the "preferred" VMs specified in the placement preferences on physical GPUs of the appropriate priority. In the second phase (FIG. 5B), placement manager 114 attempts to place all of the remaining, "non-preferred" VMs on any physical GPUs that have remaining free framebuffer memory space. And in the third phase (FIG. 5C), if one or more requested VMs remain un-placed and the cluster administrator indicates that the placement preferences do not need to be strictly followed, placement manager 114 attempts to rebalance the VM placements determined in the first and second phases in order to successfully place as many of the requested VMs as possible.

Turning now to FIG. 5A, starting with block 502, placement manager 114 can receive one or more VM provisioning requests and one or more placement preferences pertaining to those requests. For example, assume placement manager 114 receives the set of VM provisioning requests shown in Table 1 above. In this scenario, placement manager 114 may receive the placement preferences below, which indicate that (a) two VMs associated with the virtual GPU profile of 4 GB, (b) two VMs associated with the virtual GPU profile of 2 GB, and (c) three VMs associated with the virtual GPU profile of 1 GB should be placed on a physical GPU with priority value "2":

TABLE 2

| Virtual GPU Profile (framebuffer size) | Preference on GPU of Priority 2 |
|---|---|
| 4 GB | 2 |
| 3 GB | 0 |
| 2 GB | 2 |
| 1 GB | 3 |

Upon receiving the provisioning requests and placement preferences, placement manager 114 can create a priority list P of all of the physical GPU priorities identified in the received placement preferences by sorting the priorities in descending order (block 504). Placement manager 114 can then enter a first loop for each priority p in priority list P, in sorted order (block 506).

Within this first loop, placement manager 114 can create a list of preferred VMs PV that should be placed on a physical GPU of priority p per the received placement preferences and sort list PV in decreasing order based on the preferred VMs' associated virtual GPU profiles (i.e., framebuffer memory sizes) (block 508). Placement manager 114 can also create a priority GPU list PG of all physical GPUs in host cluster 104 that have priority p, as indicated in local database 118 (block 510). Placement manager 114 can thereafter enter a second loop for each preferred VM pv in preferred VM list PV (block 512) and a third loop for each physical GPU pg in priority GPU list PG (block 514).

Within the third loop, placement manager 114 can check whether preferred VM pv can be placed on physical GPU pg (or in other words, whether physical GPU pg has sufficient free framebuffer memory to accommodate the framebuffer memory size of preferred VM pv) (block 516). If the answer is yes, placement manager 114 can record the placement of preferred VM pv on physical GPU pg in a placement map data structure (block 518), decrement the amount of free framebuffer memory available to physical GPU pg by the framebuffer memory size of preferred VM pv (block 520), and proceed to the end of the current iteration of the second (i.e., preferred VM) loop (block 522).

However, if the answer at block 516 is no, placement manager 114 can check whether physical GPU pg is the last entry in priority GPU list PG (block 524). If so, placement manager 114 can terminate the workflow (because this means that the placement preferences could not be fully met). Otherwise, placement manager 114 can reach the end of the current iteration of the third (i.e., priority GPU) loop (block 526) and move on to processing the next physical GPU in priority GPU list PG.

Once the first, second, and third loops are completed, placement manager 114 will have placed all of the preferred VMs in preferred VM list PV and can move on to the second phase of the workflow (i.e., FIG. 5B).

At block 530 of FIG. 5B, placement manager 114 can create a GPU list G of all of the physical GPUs in host cluster 104 by sorting the GPUs in decreasing priority order. In the case were two physical GPUs have the same priority, they can be sorted based on their virtual GPU profiles (i.e., framebuffer sizes). In addition, at block 532, placement manager 114 can create a remaining VM list V of all of the remaining un-placed VMs (i.e., VMs that were identified in the VM provisioning requests received at block 502 but were not placed during the first phase) by sorting those VMs in decreasing profile/framebuffer size order. Placement manager 114 can then enter a fourth loop for each physical GPU g in GPU list G, in sorted order (block 534), and a fifth loop for each VM v in remaining VM list V, in sorted order (block 536).

Within the fifth loop, placement manager 114 can check whether VM v can be placed on physical GPU g (block 538). If the answer is yes, placement manager 114 can record the placement of VM v on physical GPU g in the placement map (block 540), decrement the amount of free framebuffer memory available to physical GPU g by the framebuffer memory size of VM v (block 542), and remove VM v from remaining VM list V (block 544). In addition, placement manager 114 can check whether remaining VM list V is now empty, which indicates that all requested VMs have been placed (block 546). If so, placement manager 114 can return/output the placement map (block 548) and terminate the workflow.

On the other hand, if remaining VM list V is not empty at block 546, placement manager 114 can further check whether the framebuffer memory for physical GPU g is now full (i.e., has been fully allocated) (block 550). If the answer at block 550 is yes, placement manager 114 can skip to the end of the current iteration of the fourth (i.e., GPU) loop (block 552). Otherwise, placement manager 114 can reach the end of the current iteration of the fifth (i.e., remaining VM) loop (block 554) and proceed to process the next VM v in remaining VM list V with respect to current physical GPU g.

If placement manager 114 reaches the end of the fourth loop (which means that one or more VMs in remaining VM list V are still un-placed), placement manager 114 can check whether there is at least one physical GPU in host cluster 104 that is not yet full (block 556). If the answer at block 556 is yes, placement manager 114 can query the cluster administrator/user on whether the placement preferences received at block 502 should be "strictly" or "non-strictly" followed (block 558). If the cluster administrator/user indicates that the placement preferences should be strictly followed, placement manager 114 can return/output the placement map (block 560) and workflow 500 can end. However, if the cluster administrator/user indicates that the placement preferences should be non-strictly followed, placement manager 114 can proceed to rebalance the current VM placements in attempt to place all remaining VMs, in accordance with FIG. 5C.

In particular, starting with block 562 of FIG. 5C, placement manager 114 can remove, from GPU list G, all of the physical GPUs in host cluster 104 whose framebuffer memories are fully allocated, resulting in a list of partially-filled physical GPUs G'. Placement manager 114 can then enter a sixth loop for each VM v that is still in remaining VM list V (block 564) and a seventh loop for each physical GPU g' in partially-filled GPU list G' (block 566).

At block 568, placement manager 114 can identify all of the VMs currently placed on physical GPU g' (per the placement map) and sort the identified VMs in increasing order based on their virtual GPU profiles/framebuffer sizes, resulting in a list of placed VMs V'. Placement manager 114 can thereafter enter an eighth loop for each placed VM v' in placed VM list V' (block 570).

Within the eighth loop, placement manager 114 can remove/undo, in the placement map, the placement of placed VM v' on physical GPU g' (which includes incrementing the amount of framebuffer memory available to physical GPU g' by the framebuffer size of placed VM v') (block 572), add placed VM v' to remaining VM list V (block 574), and check whether VM v can now be placed on physical GPU g' (block 576). If the answer at block 576 is yes, placement manager 114 can record the placement of VM v on physical GPU g' in the placement map (block 578), decrement the amount of free framebuffer memory available to physical GPU g' by the framebuffer memory size of VM v (block 580), and proceed to the end of the current iteration of the sixth (i.e., remaining VM) loop (block 582).

On the other hand, if the answer at block 576 is no, placement manager 114 can further check whether placed VM v' is the last entry in placed VM list V' (block 584). If so, placement manager 114 can re-place, in the placement map, all of the VMs in placed VM list V' on physical GPU g' (which includes incrementing the amount of framebuffer memory available to physical GPU g' by the combined framebuffer sizes of all of those VMs) (block 586) and can remove all of the VMs in placed VM list V' from remaining VM list V (block 588). Placement manager 114 can then reach the end of the current iteration of the eighth (i.e., placed VM) loop (block 590) and the end of the current iteration of the seventh (i.e., partially-filled GPU) loop (block 592).

Once all of the physical GPUs in partially-filled GPU list G' have been processed, placement manager 114 can update list G' to remove any physical GPUs that are now fully allocated (block 594). Placement manager 114 can subsequently reach the end of the current iteration of the sixth loop and process the next VM in remaining VM list V.

Finally, upon completing the sixth loop, placement manager 114 can return/output the placement map (block 596) and workflow 500 can end.

Figure 6A:
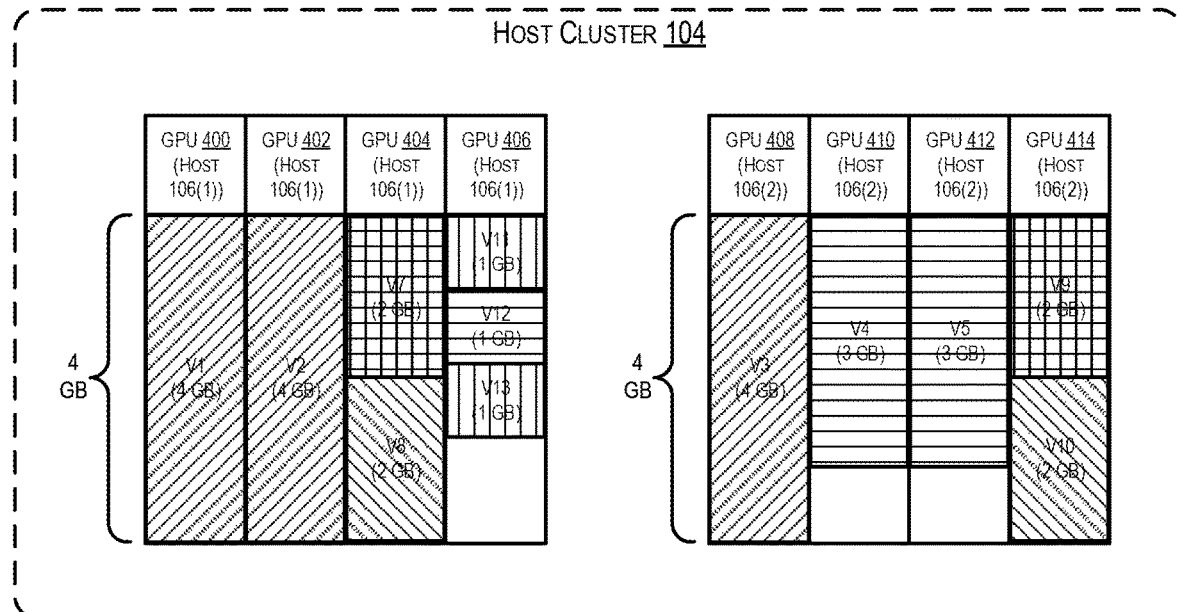
FIGS. 6A and 6B depict example VM placements determined by the workflow of FIGS. 5A-5C according to certain embodiments.

To provide a concrete example of the operation of workflow 500, FIG. 6A depicts the results of applying workflow 500 on host cluster 104 of FIG. 4A with respect to the VM provisioning requests presented in Table 1 and the placement preferences presented in Table 2, in the scenario where physical GPUs 400-406 of host system 106(1) have priority "2" and the placement preferences are strictly followed. As shown in FIG. 6A, in this scenario all of the placement preferences are satisfied, but one VM associated a virtual GPU profile of 3 GB (i.e., VM V6) remains unallocated because it could not be successfully placed.

Figure 6B:
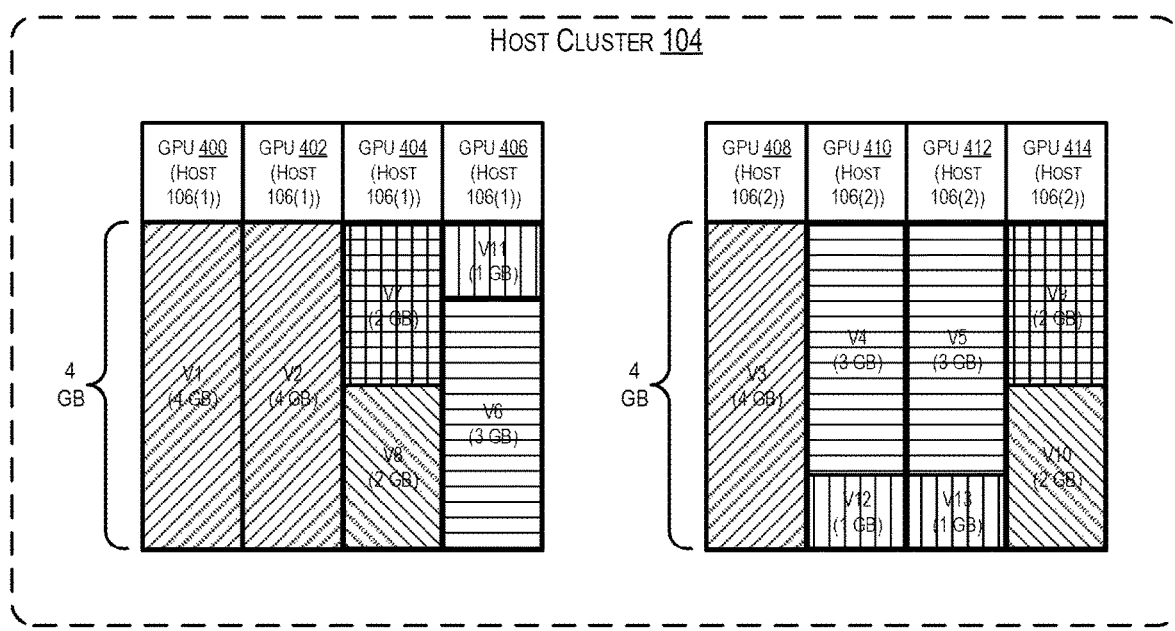

Further, FIG. 6B depicts the results of applying workflow 500 on host cluster 104 of FIG. 4A with respect to the VM provisioning requests presented in Table 1 and the placement preferences presented in Table 2, in the scenario where physical GPUs 400-406 of host system 106(1) have priority "2" and the placement preferences are not strictly followed. As shown in FIG. 6B, in this scenario all of the requested VMs, including VM V6, are successfully placed due to the rebalancing performed by placement manager 114 via the steps of FIG. 5C.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
receiving a request to provision a first virtual machine (VM) in a host cluster, the host cluster comprising a first graphics processing unit (GPU) and a second GPU, the first VM being associated with a first virtual GPU profile indicating at least a first metric; and
in response to receiving the request to provision the VM in the host cluster:
placing the first VM on the first GPU, wherein the first GPU satisfies at least the first metric, and wherein the first GPU has placed thereon a second VM, the second VM being associated with a second virtual GPU profile indicating a second metric, the first virtual GPU profile being different than the second virtual GPU profile; and
executing the first VM on the first GPU.

2. The method of claim 1, wherein during the executing, the first VM uses a portion of a free framebuffer memory of the first GPU, the portion being equal to the first metric indicating a framebuffer memory size.

3. The method of claim 1, wherein the first GPU and the second GPU have a same GPU model or architecture.

4. The method of claim 3, further comprising storing a database of available GPUs in a memory.

5. The method of claim 1, wherein the first GPU and the second GPU have different GPU models or architectures, and wherein the second GPU has a priority value corresponding to its GPU model or architecture.

6. The method of claim 5, wherein the first GPU has a priority value corresponding to its GPU model or architecture.

7. The method of claim 1, wherein the first GPU and the second GPU each have a respective framebuffer memory.

8. A computer system comprising:
memory configured to store a database of available graphics processing units (GPUs), the available GPUs including a first graphics processing unit (GPU) and a second GPU;
a network interface configured to receive a request to provision a first virtual machine (VM) in a host cluster, the host cluster comprising the first GPU and the second GPU, the first VM being associated with a first virtual GPU profile indicating at least a first metric; and
a processor configured, in response to the network interface receiving the request to provision the VM in the host cluster, to:
place the first VM on the first GPU, wherein the first GPU satisfies at least the first metric, and wherein the first GPU has placed thereon a second VM, the second VM being associated with a second virtual GPU profile indicating a second metric, the first virtual GPU profile being different than the second virtual GPU profile; and
execute the first VM on the first GPU.

9. The computer system of claim 8, wherein during the execution, the first VM uses a portion of a free framebuffer memory of the first GPU, the portion being equal to the first metric indicating a framebuffer memory size.

10. The computer system of claim 8, wherein the network interface is connected to the host cluster.

11. The computer system of claim 8, wherein the host cluster further comprises a hypervisor.

12. The computer system of claim 8, wherein the first GPU and the second GPU have different GPU models or architectures, and wherein the second GPU has a priority value corresponding to its GPU model or architecture.

13. The computer system of claim 12, wherein the first GPU has a priority value corresponding to its GPU model or architecture.

14. The computer system of claim 8, wherein the first GPU and the second GPU have a same GPU model or architecture.

15. A computer system comprising:
a processor;
a memory configured to store a database of available graphics processing units (GPUs); and
a non-transitory computer readable medium having stored thereon program code that, when executed by the processor, causes the processor to:
receive a request to provision a first virtual machine (VM) in a host cluster, the host cluster comprising a first graphics processing unit (GPU) and a second GPU, the first VM being associated with a first virtual GPU profile indicating at least a first metric; and
in response to receiving the request to provision the VM in the host cluster:
place the first VM on the first GPU, wherein the first GPU satisfies at least the first metric, and wherein the first GPU has placed thereon a second VM, the second VM being associated with a second virtual GPU profile indicating a second metric, the first virtual GPU profile being different than the second virtual GPU profile; and
execute the first VM on the first GPU.

16. The computer system of claim 15, wherein during the execution, the first VM uses a portion of a free framebuffer memory of the first GPU, the portion being equal to the first metric indicating a framebuffer memory size.

17. The computer system of claim 15, wherein the first GPU and the second GPU have a same GPU model or architecture.

18. The computer system of claim 15, wherein the first GPU and the second GPU have different GPU models or architectures, and wherein the second GPU has a priority value corresponding to its GPU model or architecture.

19. The computer system of claim 18, wherein the first GPU has a priority value corresponding to its GPU model or architecture.

20. The computer system of claim 19 wherein the first GPU and the second GPU each have a respective framebuffer memory.

* * * * *